United States Patent
Gente et al.

(10) Patent No.: US 11,777,116 B2
(45) Date of Patent: Oct. 3, 2023

(54) FUEL CELL SYSTEM WITH A VIBRATION GENERATOR, AND METHOD FOR OPERATING A FUEL CELL SYSTEM WITH A VIBRATION GENERATOR

(71) Applicant: Robert Bosch GmbH, Stuttgart (DE)

(72) Inventors: Arnold Gente, Stuttgart (DE); Jan Hendrik Ohs, Renningen (DE); Udo Riegler, Stuttgart (DE); Ulrich Berner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/778,427

(22) PCT Filed: Nov. 5, 2020

(86) PCT No.: PCT/EP2020/081056
§ 371 (c)(1),
(2) Date: May 20, 2022

(87) PCT Pub. No.: WO2021/099125
PCT Pub. Date: May 27, 2021

(65) Prior Publication Data
US 2022/0416270 A1    Dec. 29, 2022

(30) Foreign Application Priority Data
Nov. 20, 2019  (DE) ...................... 10 2019 217 877.4

(51) Int. Cl.
*H01M 8/04*         (2016.01)
*H01M 8/04119*      (2016.01)
(Continued)

(52) U.S. Cl.
CPC ... *H01M 8/04156* (2013.01); *H01M 8/04007* (2013.01); *H01M 8/04492* (2013.01);
(Continued)

(58) Field of Classification Search
None
See application file for complete search history.

(56) References Cited

U.S. PATENT DOCUMENTS 6,117,579 A * 9/2000 Gyoten ............... H01M 4/8657
                                                    429/492
6,472,090 B1   10/2002 Colbow et al.
(Continued)

FOREIGN PATENT DOCUMENTS

CN        206849951 U      1/2018
DE     102004013256 A1    10/2005
(Continued)

OTHER PUBLICATIONS

English translation of JP2013/196767 to Kawai et al. (Year: 2013).*
(Continued)

*Primary Examiner* — Lucas J. O'Donnell
(74) *Attorney, Agent, or Firm* — Michael Best & Friedrich LLP

(57) ABSTRACT

A fuel cell system (200), wherein the fuel cell system (200) has: a) a fuel cell stack (10), b) an anode gas path (20) which fluidically communicates with the fuel cell stack (10) and which serves for supplying anode gas from an anode gas store (22) to the fuel cell stack (10), c) a cathode gas path (30) which fluidically communicates with the fuel cell stack (10) and which serves for supplying cathode gas from a cathode gas store (32) to the fuel cell stack (10), d) a cooling fluid path (40) which fluidically communicates with the fuel cell stack (10) and which serves for supplying cooling fluid from a cooling fluid store (42) to the fuel cell stack (10), e) a vibration generator (60) which is in data-transmitting communication with a control unit (50) and which serves for setting the fuel cell stack (10) into a vibrating state, and f) the control unit (50) for actuating the vibration generator
(Continued)

(60) in order to set the fuel cell stack (10) into the vibrating state by means of the vibration generator (60).

12 Claims, 4 Drawing Sheets

(51) Int. Cl.
*H01M 8/04007* (2016.01)
*H01M 8/04492* (2016.01)
*H01M 8/04746* (2016.01)
*H01M 8/04828* (2016.01)

(52) U.S. Cl.
CPC ... *H01M 8/04753* (2013.01); *H01M 8/04768* (2013.01); *H01M 8/04776* (2013.01); *H01M 8/04828* (2013.01)

(56) References Cited

U.S. PATENT DOCUMENTS

2008/0050620 A1* 2/2008 Frost ................ H01M 8/04179
429/432

| | | | |
|---|---|---|---|
| 2010/0003546 | A1 | 1/2010 | Hochgraf et al. |
| 2010/0279193 | A1 | 11/2010 | Yamagishi et al. |
| 2014/0134508 | A1 | 5/2014 | Ishikawa |

FOREIGN PATENT DOCUMENTS

| | | |
|---|---|---|
| DE | 102005029536 A1 | 12/2006 |
| DE | 102013021468 A1 | 6/2014 |
| JP | 3485243 B2 | 1/2004 |
| JP | 2009099534 A | 5/2009 |
| JP | 2013196767 A | 9/2013 |

OTHER PUBLICATIONS

Translation of International Search Report for Application No. PCT/EP2020/081056 dated May 4, 2021 (4 pages).

* cited by examiner

FUEL CELL SYSTEM WITH A VIBRATION GENERATOR, AND METHOD FOR OPERATING A FUEL CELL SYSTEM WITH A VIBRATION GENERATOR

BACKGROUND OF THE INVENTION

A fuel cell is an electrochemical cell having two electrodes that are separated from one another by means of an ion-conducting electrolyte. The fuel cell converts the energy from a chemical reaction of a fuel with an oxidizing agent directly to electricity. A fuel cell has an anode and a cathode. There exist various types of fuel cells.

One specific type of fuel cell is the polymer electrolyte membrane fuel cells (PEM-FC). In a PEM-FC, a polymer electrolyte membrane (PEM) is adjoined by two porous electrodes having a catalyst layer. The PEM-FC further comprises gas diffusion layers (GDL) that adjoin the polymer electrolyte membrane (PEM) and the two porous electrodes having a catalyst layer on either side. The polymer electrolyte membrane, the two electrodes having the catalyst layer and the two gas diffusion layers form what is called a membrane electrode assembly (MEA). Bipolar plates in turn adjoin the MEA on either side. A fuel cell stack is constructed from MEAs and bipolar plates arranged alternately one on top of another. On an anode side of a bipolar plate there is a distribution of the fuel, especially hydrogen, and on a cathode side of the bipolar plate a distribution of the oxidizing agent, especially air/oxygen. In the operation of a fuel cell, hydrogen molecules are split at the catalyst layer to give protons and electrons. The protons penetrate the membrane from the anode side to the cathode side. On the cathode side, oxygen molecules are reduced at the catalyst layer, and these combine with the protons to form water molecules. An appropriate water content in the fuel cell stack is always a challenge. Water molecules that have been formed by the abovementioned reaction exit from the catalyst layer into the GDL, where they can combine to form liquid water droplets. These are capable, for example, of blocking gas ducts of a bipolar plate or ducts in a gas diffusion layer, i.e. of making them impervious to fluid. Particularly operation of a fuel cell stack at high current densities can produce a particularly large amount of liquid water. Disadvantageously, the blocking can result in a shortage of hydrogen and oxygen, and operation of the fuel cell can be disrupted. This can also lead to a loss of function or degradation of the fuel cell.

Publication DE 10 2013 021 468 A1 discloses, for atomization of water droplets, a vibration-inducing device for a fuel cell, by means of which at least one component of the fuel cell can be subjected to a forced vibration. For this purpose, a high-frequency switch is coupled to a first function generator in the form of a sinusoidal source and with a second function generator in the form of a pulse generator, wherein an output vibration signal from the high-frequency switch can be transmitted to the at least one component of the fuel cell.

Publication DE 10 2004 013 256 A1 discloses a method of increasing the temperature of a fuel cell for operation of the fuel cell, wherein the release of heat from a latent heat reservoir is triggered by the input coupling of a pressure wave or soundwave.

Publication DE 10 2005 029 536 A1 discloses, for reducing the egress of water from a fuel cell system, a method of operating the fuel cell system with a fuel cell and a fuel cell offgas outlet, wherein water present in the fuel cell offgas is atomized by means of ultrasound.

SUMMARY OF THE INVENTION

The present invention discloses a fuel cell system and a method of operating a fuel cell system.

Features and details described in connection with the fuel cell system of the invention are of course also applicable in connection with the method of the invention and vice versa in each case, such that there is always, or may always be, mutual reference with regard to the individual aspects of the invention.

In a first aspect, the present invention discloses a fuel cell system, wherein the fuel cell system comprises:
a) a fuel cell stack,
b) an anode gas pathway in fluid communication with the fuel cell stack for supply of the fuel cell stack with anode gas from an anode gas reservoir,
c) a cathode gas pathway in fluid communication with the fuel cell stack for supply of the fuel cell stack with cathode gas from a cathode gas reservoir,
d) a cooling fluid pathway in fluid communication with the fuel cell stack for supply of the fuel cell stack with cooling fluid from a cooling fluid reservoir,
e) a vibration generator in data communication with a control unit for setting the fuel cell stack in a vibrating state, and
f) the control unit for actuating the vibration generator, in order to set the fuel cell stack in the vibrating state by means of a vibration generator.

The fuel cell system of the invention, by means of the control unit for actuating the vibration generator and the vibration generator for setting the fuel cell stack in the vibrating motion, can ensure efficient, uniform and undisrupted operation of the fuel cell system in a particularly simple, inexpensive, safe and rapid manner. Moreover, the lifetime of the fuel cell system can be prolonged. Efficient, uniform and undisrupted operation may especially be understood to mean the operation of the fuel cell system at an appropriate water content. An appropriate water content may mean that a minimum number of fluid-conducting ducts, especially no fluid-conducting ducts, of a gas diffusion layer and/or of a bipolar plate are impervious to fluid as a result of water, especially excess water. It is thus possible to ensure that the cathode gas and/or the anode gas can flow in fluid form as per the intended function. Excess water is especially understood to mean the water which is not needed for efficient, uniform and undisrupted operation of the fuel cell system. A gas diffusion layer and/or membrane, in efficient, uniform and undisrupted operation of a fuel cell, is advantageously to have an appropriate moisture content, such that there is an appropriate electrical conductivity of this component of the fuel cell. The term "water" may mean individual water molecules. The term "water" may also mean water droplets or "water puddles". Water puddles may occur, for example, in a gas diffusion layer by combination of many water molecules, especially water droplets, to give a water puddle. Water may especially accumulate at a cathode side of a bipolar plate in the regions in which the cathode-side bipolar plate is in direct contact with a gas diffusion layer.

The fuel cell system of the invention may then discharge water, especially excess water, for example from a gas diffusion layer and/or from a bipolar plate, by virtue of the setting of the fuel cell stack in the vibrating motion. Discharge of water from a gas diffusion layer of a fuel cell may mean that water, especially excess water, from the gas diffusion layer moves in a direction away from a membrane of the fuel cell toward a bipolar plate of the fuel cell. Advantageously, the water, especially the excess water, moves from the gas diffusion layer into a duct of the bipolar plate, and is discharged or removed by the flowing anode gas or cathode gas. It is thus possible to free fluid-conducting ducts of a gas diffusion layer and/or of a bipolar plate of water, especially excess water. In other words, these ducts can become permeable to fluid again. The active region of the fuel cell system, especially of a fuel cell, can thus be supplied more uniformly with hydrogen and oxygen. Uniform operation is thus ensured in a particularly advantageous manner.

The fuel cell stack may comprise a fuel cell. The fuel cell stack preferably comprises two or more fuel cells. A fuel cell may have a membrane, two opposite catalyst layers each disposed on one side of the membrane, and two opposite gas diffusion layers each disposed on one of the catalyst layers. Moreover, the fuel cell may be bounded by a cathode side of a first bipolar plate, where the first bipolar plate comprises the cathode side and an anode side, and an anode side of a second bipolar plate opposite the cathode side of the first bipolar plate, where the second bipolar plate has the anode side and a cathode side. On an anode side of a bipolar plate, a distribution of the anode gas, especially hydrogen, may take place. One a cathode side of the bipolar plate, a distribution of the cathode gas, especially air/oxygen, may take place. In an operation of a fuel cell, hydrogen molecules may be split and migrate as protons through the membrane from the anode side in the direction of the cathode side. The oxygen molecules may be reduced, and these may combine with the protons to give water molecules. The water molecules may form liquid water through accumulation in the MEA and through condensation, and, for example, make gas ducts of a bipolar plate and/or ducts of a gas diffusion layer impermeable to liquid.

Advantageously, the bipolar plates are in vertical alignment in a state of operation of the fuel cell system. More particularly, the bipolar plates may have an anode gas flow structure and cathode gas flow structure with channels for guiding the anode gas or cathode gas in an active region of the fuel cell stack in the direction of the gravitational field lines. In this way, in a fuel cell system of the invention, it is possible in a particularly advantageous and simple manner to discharge water from the gas diffusion layers and from the bipolar plates. An anode side and/or a cathode side of a bipolar plate may also have a hydrophilic coating. Advantageously, a hydrophilic coating may permit particularly advantageous wetting of an anode side and/or cathode side of a bipolar plate with water. For example, water discharged in this way can particularly advantageously be removed with the anode gas or cathode gas. In addition, especially for operation of a fuel cell at high current densities, a particularly advantageous cooling effect on account of the heat of evaporation required to evaporate the water may occur.

The anode gas pathway and/or cathode gas pathway and/or cooling fluid pathway may comprise fluid-conducting conduits from the anode gas reservoir or from the cathode gas reservoir or from the cooling fluid reservoir for supply of the fuel cell stack with anode gas or cathode gas or cooling fluid.

The anode gas pathway may include the anode gas reservoir, especially a hydrogen reservoir. The anode gas pathway may include, as a component, a valve such as a main valve, which is closed in the event of a fault in the fuel cell system, a pressure release valve, which can protect the fuel cell stack from excessively high pressure, and/or a purge valve for discharge of liquid water and nitrogen together with a little hydrogen. Moreover, the anode gas pathway may include, as a component, a pressure regulator for reducing the pressure of the anode gas reservoir to the anode gas inlet pressure required by the fuel cell stack. Moreover, the anode gas pathway may comprise, as a component, a compressor, such as a recirculation pump for recycling the unconverted hydrogen.

The cathode gas pathway may include the cathode gas reservoir. The cathode gas reservoir may especially be the ambient air. The cathode gas pathway may include valves. The cathode gas pathway may include, as a component, a compressor such as an air compressor. In addition, the cathode gas pathway, as one component, may comprise a pressure regulator for regulating the pressure of the cathode gas in the fuel cell stack.

The cooling fluid pathway may include the cooling fluid reservoir. The cooling fluid may, for example, be cooling water. More particularly, the cooling fluid pathway may comprise, as a component, a compressor such as a cooling fluid pump. The coolant pump can determine, for example, the flow of the coolant. Moreover, the cooling fluid pathway may include, as a component, a valve such as a control valve for adjusting the inlet temperature of the coolant into the fuel cell stack.

The control unit may include open-loop and/or closed-loop control electronics for actuation of the vibration generator. Open-loop and/or closed-loop control electronics may especially be understood to mean a processing unit and a memory unit, and with an operating program stored in the memory unit. The control unit may be integrated within the vibration generator. Moreover, the control unit may be formed by a control device of a vehicle. If the control unit is formed by a control device of a vehicle, it is possible to save additional costs for a separate control unit.

Data can be communicated between the control unit and the vibration generator by means of electrical wires. It is also possible for there to be wireless data communication between the control unit and the vibration generator.

The fuel cell system may include multiple vibration generators and/or control units.

The vibration generator may be designed, in particular, to set bipolar plates and/or membranes and/or gas diffusion layers of the fuel cell stack in the state of vibration. It is also advantageous that the vibration generator is set up to induce vibration of the anode gas and/or the cathode gas and/or the cooling fluid. If there is vibration of a fluid, such as the anode gas, cathode gas or cooling fluid, the vibrations can propagate by means of the fluid in the respective pathway, especially in the direction of the fuel cell stack, and hence set the fuel cell stack in the vibrating state. The vibration generator may be designed to set the fuel cell stack permanently in the vibrating state. It is thus possible to ensure particularly reliable efficient, uniform and undisrupted operation of the fuel cell system.

The vibrating state may be understood to mean a state of the fuel cell stack in which the fuel cell stack has, and especially performs, vibrations. Vibration may be understood to mean repeated back-and-forth movement over time about a rest position of the fuel cell stack. A vibration may have a particular frequency. A vibration may advantageously be a forced vibration. The vibration generator, in order to set the fuel cell stack in a vibrating state, can periodically excite the fuel cell stack with forced vibrations.

It is also conceivable that the vibration generator sets the fuel cell stack in the vibrating state from a state of rest of the fuel cell stack, and vice versa. A state of rest may be understood to mean a state in which the vibration generator does not set the fuel cell stack in the vibrating state, i.e. the fuel cell stack is at rest. The vibration generator, in a state of operation of the fuel cell system, can set the fuel cell stack in the state of vibration in order, for example, to discharge water from the fuel cell stack during operation. In the state of operation, the fuel cell system can generate energy, especially electrical energy. As a result, the fuel cell system can be operated in a particularly advantageous manner. The vibration generator can set the fuel cell stack in a non-operative state of the fuel cell system in the state of vibration in order, for example, to warm up the fuel cell system and/or to distribute water homogeneously in the gas diffusion layers. It is thus possible to put a fuel cell system into operation in a particularly advantageous manner.

It may be advantageous when, in a fuel cell system of the invention, the fuel cell system comprises, as the vibration generator, a voltage transformer in electrical communication with the fuel cell stack for conversion of the output voltage of the fuel cell stack, where the voltage transformer is designed for actuation upstream of the control unit in such a way that the fuel cell stack can be set in the vibrating state by drawing of a pulsed current by the voltage transformer from the fuel cell stack. In a frequency-dependent manner, a change in the current withdrawn can excite the fuel cell stack via electrical field forces, via magnetic field forces and/or via modeling of the corresponding streams of matter. The voltage transformer may be a DC-DC transformer for transformation of the DC output voltage from the fuel cell stack to a DC voltage compatible for a battery, for example of a motor vehicle. Drawing of pulsed current may be understood to mean that the current from the fuel cell stack is drawn not in a continuous manner but in time-limited portions, i.e. in pulses. By means of pulsed drawing of current, it is possible to influence chemical reactions in the fuel cell stack. More particularly, by means of pulsed drawing of current, it is possible to influence the speed with which the chemical reactions proceed. It is preferably possible to increase the rate, especially the average rate, with which the chemical reactions proceed. For example, it is possible to influence the chemical reaction between reduced oxygen molecules and the hydrogen present in the form of protons in the membrane and the two catalyst layers. It is also conceivable that the speed with which the hydrogen molecules are split over a catalyst to give protons is influenced. By means of drawing of pulsed current, it is also possible to influence the speed of the anode gas, especially the speed of the molecules of the anode gas, and/or the speed of the cathode gas, especially the speed of the molecules of the cathode gas, by means of the voltage transformer. These influences, by means of the voltage transformer, can also set bipolar plates, gas diffusion layers and membranes of the fuel cell stack in the vibrating motion. The setting of the fuel cell stack in a state of vibration by drawing of pulsed current by the voltage transformer can discharge excess water in a particularly advantageous manner from a gas diffusion layer and/or from a bipolar plate. More particularly, water may be atomized and hence discharged more effectively in the ducts of a bipolar plate and/or gas diffusion layer to give small water droplets. Consequently, efficient, uniform and undisrupted operation of the fuel cell system can be ensured in a particularly simple, inexpensive, safe and rapid manner.

Advantageously, in a fuel cell system of the invention, the fuel cell system may comprise, as vibration generator, a component of the anode gas pathway and/or of the cathode gas pathway and/or of the cooling fluid pathway for control of the flow of the anode gas and/or of the cathode gas and/or of the cooling fluid, where the component is designed to be actuated by the control unit in such a way that the component is switchable between at least a first switching state and a second switching state, such that the fuel cell stack can be set in the vibrating state by the switching of the component. The flow of the anode gas or of the cathode gas or of the cooling fluid in the at least one first switching state and the second switching state is preferably different. The component of the control unit is preferably actuated such that, in the at least one first switching state and in the second switching state, it enables flow of the cathode gas or of the anode gas or of the cooling fluid. In this way, it is possible to ensure that the fuel cell system, especially the fuel cell stack, is supplied continuously with anode gas, cathode gas and cooling fluid. The switching between the at least one first switching state and the second switching state can cause a fluid to vibrate, especially to vibrate with a preferred frequency, especially with a preferred frequency. In the vibrating state of the fuel cell stack, water can then pass from gas diffusion layers and/or bipolar plates of the fuel cell stack into the gas phase, especially without being atomized. In this way, it is possible to discharge the water particularly effectively, and improved operation of the fuel cell system is possible.

Particularly advantageously, in a fuel cell system of the invention, the component may be one of the following components:

a valve,
a compressor.

A valve may be a particularly simple valve by means of which the flow of a fluid can be controlled. When the component is a valve, the at least one first switching state may be the fully open position of the valve, and the second switching state may be an incompletely open, for example a three-quarters-open, position of the valve. In this way, it is possible in a particularly simple manner to set the fuel cell stack in the vibrating state by means of the switching, especially switching back and forth, of the valve between the at least one first switching state and the second switching state. For example, the valve in the anode gas pathway may be the main valve for control of the flow of the anode gas from the anode gas reservoir. The valve used may, for example, be a magnetic valve in the anode gas pathway and/or cathode gas pathway and/or cooling fluid pathway. Advantageously, magnetic valves can switch very quickly. This means that the magnetic valve of the control unit can be switched particularly rapidly between the at least one first switching state and the second switching state and the fuel cell stack can be set in a vibrating state. Advantageously, a valve, especially a magnetic valve, may be used as component in the cooling fluid pathway of the fuel cell system. The cooling fluid in the cooling fluid pathway may have a particularly high bulk modulus compared to the anode gas and the cathode gas. For example, the bulk modulus of the cooling fluid may be between 24 000 bar and 26 000 bar, especially 25 000 bar. It is thus possible for vibrations in the cooling fluid pathway to propagate particularly rapidly in the direction of the fuel cell stack and to set the fuel cell stack in the vibrating state in a particularly advantageous manner.

A compressor may likewise be a particularly simple component by means of which the flow of a fluid can be controlled. More particularly, an air compressor in the cathode gas pathway may be the compressor. It is also conceivable that the compressor used is a recirculation pump in the anode gas pathway. When the component is a compressor, the at least one first switching state may be a first operating point of the compressor, and the second switching state a second operating point of the compressor. At a first operating point the compressor may release a first supply volume of a fluid, i.e. a volume of a released fluid, and at a second operating point the compressor may release a second supply volume of the fluid which is different than the first supply volume. It is thus possible in a particularly simple manner to set the fuel cell stack in the vibrating state. The use of an existing compressor or valve can save costs and construction space.

In a further preferred embodiment, in a fuel cell system of the invention, the fuel cell system may comprise, as vibration generator, a knocker component disposed on the fuel cell stack for impacting with the fuel cell stack, wherein the knocker component is mechanically connected to the fuel cell stack and is designed to be actuated by the control unit in such a way that the fuel cell stack is set in the vibrating state by the impacting with the fuel cell stack. The knocker component preferably impacts with bipolar plates of the fuel cell stack. The fuel cell stack may have a housing, in which case the knocker component is disposed on the housing. It is also conceivable that the knocker component impacts with the housing of a fuel cell stack. It is thus possible to prevent the components of the fuel cell stack, such as membrane, gas diffusion layers and bipolar plates, from being damaged by the impacting. The knocker component may be an actuator. The actuator may be actuated via electrical signals from the control unit and may perform mechanical movements as impacts. More particularly, the actuator is a magnetic actuator, in which case the impacting of the anchor of the magnetic actuator on bipolar plates of the fuel cell stack, for example, sets the bipolar plates in the vibrating state. Proceeding from the bipolar plates, it is thus particularly advantageously also possible to set other components of the fuel cell stack, such as membranes and/or gas diffusion layers, in the vibrating state. In the vibrating state of the fuel cell stack, it is then possible for water from gas diffusion layers and/or bipolar plates of the fuel cell stack to be converted to the gaseous phase, especially without being atomized. This results in particularly effective discharge of the water. Such a knocker component can be retrofitted in a particularly simple manner and causes only a minor level of stress, especially none, on components such as compressors or valves of the fuel cell system.

It may be advantageous when, in a fuel cell system of the invention, the fuel cell system has a water content sensor in data communication with the control unit for ascertaining the water content of the fuel cell stack, and that the control unit of the fuel cell system is also designed to control the vibration generator for setting the fuel cell stack in the vibrating state as a function of the water content of the fuel cell stack ascertained by the water content sensor. The water content sensor can communicate the ascertained water content to the control unit via electrical wires or wirelessly. A water content sensor can ascertain the water content of gas diffusion layers and membranes in particular. A water content sensor may be disposed in the fuel cell stack and can directly ascertain the water content of the gas diffusion layers and membranes. A water content sensor may also be disposed in the anode gas pathway and/or cathode gas pathway and indirectly ascertain the water content of the fuel cell stack, especially of gas diffusion layers and membranes, via the moisture content in the respective fluid. In a memory unit of the control unit, an optimal water content may be recorded for every operating point of the fuel cell system, especially of the fuel cell stack. If, for example, the water content of the fuel cell stack is too high, meaning that excess water may have accumulated in the gas diffusion layers, the vibration generator is then controlled to the optimal water content by the control unit, for example by virtue of the vibration generator setting the fuel cell stack in a vibrating state with vibrations of altered, especially elevated, frequency. It is also conceivable that the amplitude of the vibrations of the fuel cell stack is varied, especially increased. This can particularly advantageously achieve efficient, uniform and undisrupted operation of the fuel cell system.

In a second aspect, the present invention discloses a method of operating a fuel cell system of the invention, the method comprising the following steps:
  a) actuating the vibration generator by means of the control unit,
  b) setting the fuel cell stack in the vibrating state by means of the vibration generator.

Advantageously, in a method of the invention, the control unit actuates the voltage transformer, and the voltage transformer draws current in pulsed form from the fuel cell stack, such that the drawing of pulsed current sets the fuel cell stack in the vibrating state.

Particularly advantageously, in a method of the invention, the control unit can actuate the component of the anode gas pathway and/or of the cathode gas pathway and/or of the cooling fluid pathway for control of the flow of the anode gas and/or of the cathode gas and/or of the cooling fluid, and the component is switched between at least a first switching state and a second switching state, such that the switching sets the fuel cell stack in the vibrating state.

In a further preferred embodiment, in a method of the invention, the control unit can actuate the knocker component disposed on the fuel cell stack for impacting with the fuel cell stack and the knocker component can knock the fuel cell stack, such that the impacting sets the fuel cell stack in the vibrating state.

Advantageously, in a method of the invention, a water content sensor ascertains the water content of the fuel cell stack and communicates the water content to the control unit, wherein the control unit controls the actuating of the vibration generator and thus the setting of the fuel cell stack in the vibrating state by means of the vibration generator depending on the water content ascertained by the water content sensor.

In a further preferred embodiment, in a method of the invention, the vibration generator can set the fuel cell stack in the vibrating state with a frequency of 500 Hz to 50 kHz, especially with a frequency of 16 kHz to 25 kHz. Frequencies in the range above 16 kHz are particularly advantageous since they are above the frequency range of human hearing. More preferably, frequencies in the range from 16 kHz to 25 kHz are used, since these are outside the frequency range of human hearing, and the necessary energy expenditure for the vibration generator can be kept low. This can preferably be effected by the drawing of pulsed current.

In an alternative preferred embodiment, in a method of the invention, the vibration generator can set the fuel cell stack in the vibrating state with a frequency of 50 Hz to 200 Hz. This can preferably be effected by means of a magnetic valve in the cathode gas pathway. Even in the case of such a frequency range, the water can be discharged particularly effectively, and improved operation of the fuel cell system can be enabled.

Particularly advantageously, in a method of the invention, the vibration generator can set the fuel cell stack in the vibrating state at particular time intervals. The setting of the fuel cell stack in the vibrating state at particular time intervals can save energy compared to a permanent vibrating state. More particularly, the time intervals determined may have been determined in advance for every operating point of the fuel cell system, for example in a test setup of the fuel cell system, and may have been recorded in a memory unit of the control unit. In this way, it is possible to optimize the operation of the fuel cell system.

The method according to the second aspect of the invention thus has the same advantages as already described for the fuel cell system according to the first aspect of the invention.

Further measures that improve the invention will be apparent from the description that follows with regard to some working examples of the invention that are shown in schematic form in the figures. All features and/or advantages that are apparent from the claims, the description or the drawings, including construction details, spatial arrangements and method steps, may be essential to the invention either on their own or in the different combinations. It should be noted here that the figures have merely descriptive character and are not intended to restrict the invention in any way.

BRIEF DESCRIPTION OF THE DRAWINGS

The figures show, in schematic form.

In the figures that follow, identical reference numerals are used even by different working examples of the same technical features.

DETAILED DESCRIPTION

Figure 1:
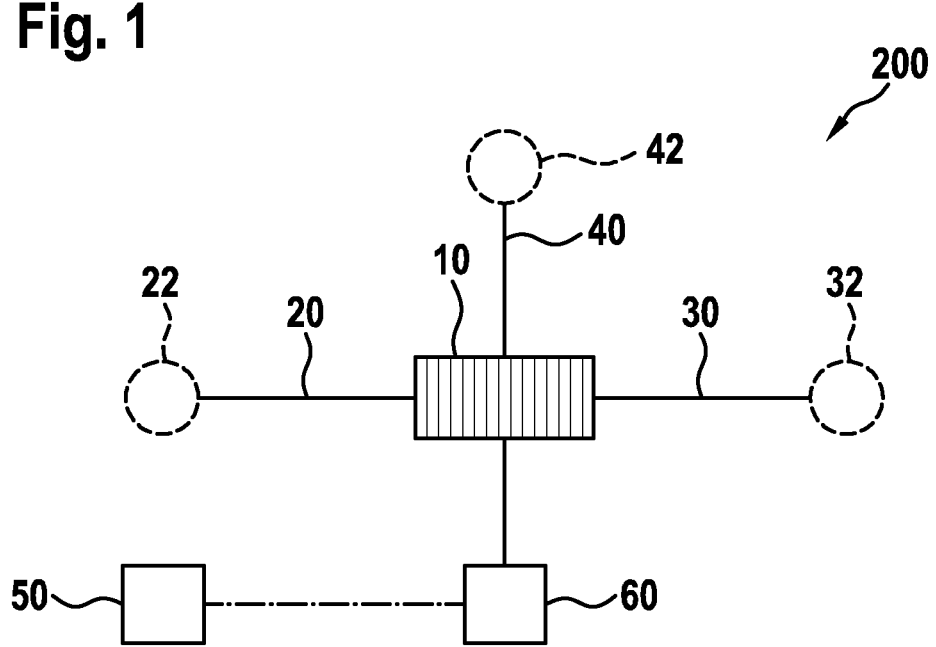
FIG. 1 a fuel cell system of the invention with a vibration generator.

FIGS. 1 to 6 show various embodiments of an inventive fuel cell system 200. In FIGS. 1 to 6, a fuel cell stack 10 is connected by means of an anode gas pathway 20 to an anode gas reservoir 22, by means of a cathode gas pathway 30 to a cathode gas reservoir 32, and by means of a cooling fluid pathway 40 to a cooling fluid reservoir 42. In this way, the fuel cell stack 10 is supplied with anode gas, cathode gas and cooling fluid. During the operation of the fuel cell system 200, hydrogen molecules that have been split at the catalyst layer to give protons migrate from an anode side of a fuel cell of the fuel cell system 200 to a cathode side, in order to combine with the reduced oxygen molecules to give water molecules. These water molecules can combine, for example, to give water droplets and make channels of a gas diffusion layer and/or channels of a bipolar plate impervious to fluid. Wires for data communication, for example an electrical wire, for the sake of clarity, may be illustrated by a dashed and dotted line.

Moreover, FIG. 1 shows a control unit 50 that actuates a vibration generator 60. If the vibration generator 60 is actuated by the control unit 50, the vibration generator 60 sets the fuel cell stack 10 in a vibrating state. A vibrating state may be understood to mean a state of the fuel cell stack 10 in which it performs vibrations owing to the vibration generator 60. The vibration generator 60 can especially set bipolar plates and/or membranes and/or gas diffusion layers of the fuel cell stack 10 in the vibrating state. The vibration generator 60 can also cause the anode gas and/or the cathode gas and/or the cooling fluid to vibrate, and hence set the fuel cell stack 10 in the vibrating state. The setting of the fuel cell stack 10 in the vibrating state allows excess water, for example, to be discharged from the gas diffusion layers of the fuel cells of the fuel cell stack 10. The inventive fuel cell system 200 can therefore ensure efficient, uniform and undisrupted operation of the fuel cell system 200 in a particularly simple, inexpensive, safe and reliable manner. Moreover, the lifetime of the fuel cell system 200 can be prolonged.

Figure 2:
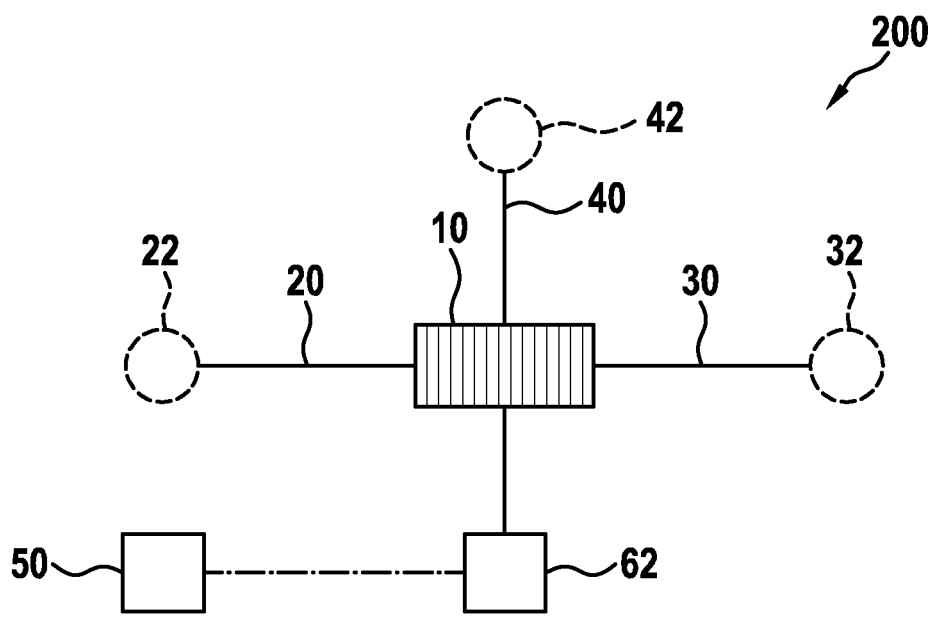
FIG. 2 a fuel cell system of the invention with a DC-DC transformer as vibration generator, FIG. 3 a fuel cell system of the invention with a valve as vibration generator, FIG. 4 a fuel cell system of the invention with multiple components as vibration generators, FIG. 5 a fuel cell system of the invention with a knocker component as vibration generator, FIG. 6 a fuel cell system of the invention with a water content sensor, FIG. 7 a method of the invention, FIG. 8 a method of the invention, and FIG. 9 a method of the invention.

FIG. 2 shows a working example of a fuel cell system 200 having a control unit 50, wherein the control unit is connected to a DC-DC transformer 62 and actuates the DC-DC transformer 62 in order to set the fuel cell stack 10 in a vibrating state. The DC-DC transformer 62 is connected by electrical wires to the fuel cell stack 10 and can convert the DC output voltage of the fuel cell stack 10 to a DC voltage compatible for a battery of a motor vehicle. The DC-DC transformer may also be connected to a battery (not shown). The control unit 50 actuates the DC-DC transformer in such a way that it draws in a pulsed manner from the fuel cell stack 10. This pulsed withdrawal of current allows the fuel cell stack 10, especially the bipolar plates and/or gas diffusion layers and/or membranes of the fuel cell stack 10, to be set in the vibrating state. Advantageously, the pulsed drawing of current can be effected with a frequency of 20 kHz.

Figure 3:
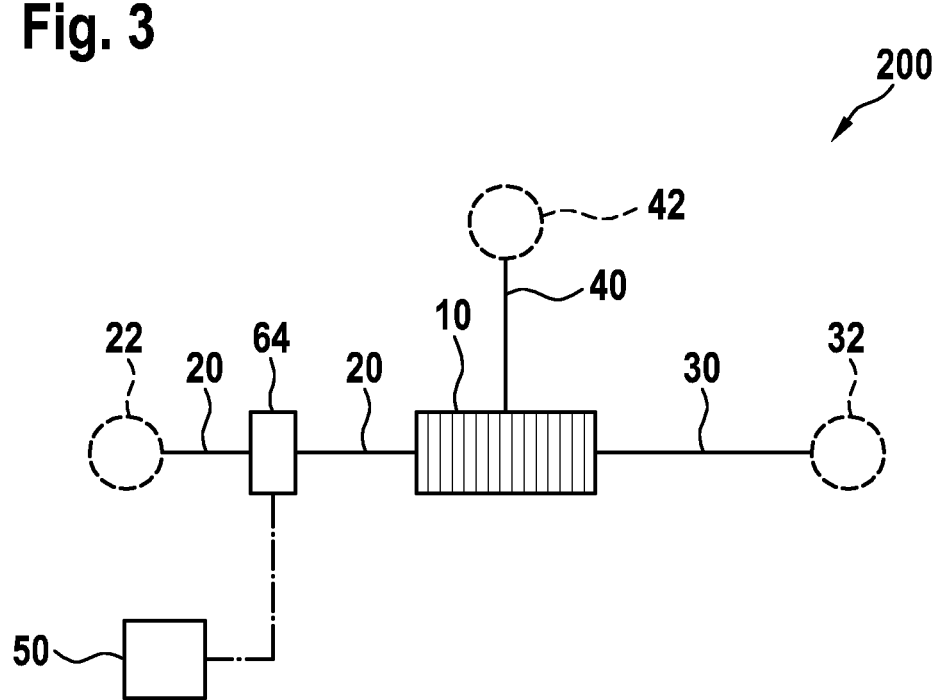

The embodiment in FIG. 3 shows a control unit 50 which actuates a component of an anode gas pathway, for example a valve 64. The valve 64 is actuated by the control unit 50 in such a way that the valve 64 is switched between at least a first switching state and a second switching state, especially repeatedly switched back and forth. This alters the flow of the anode gas in the anode gas pathway, and the anode gas can be caused to vibrate. These vibrations can propagate in the direction in the anode gas pathway 20 toward the fuel cell stack 10, and set the fuel cell stack 10, especially bipolar plates, gas diffusion layers and membranes, in the vibrating state. Advantageously, a valve is used in the direct proximity of the fuel cell stack 10, such that the vibrations of the anode gas undergo a minimum level of damping.

Figure 4:
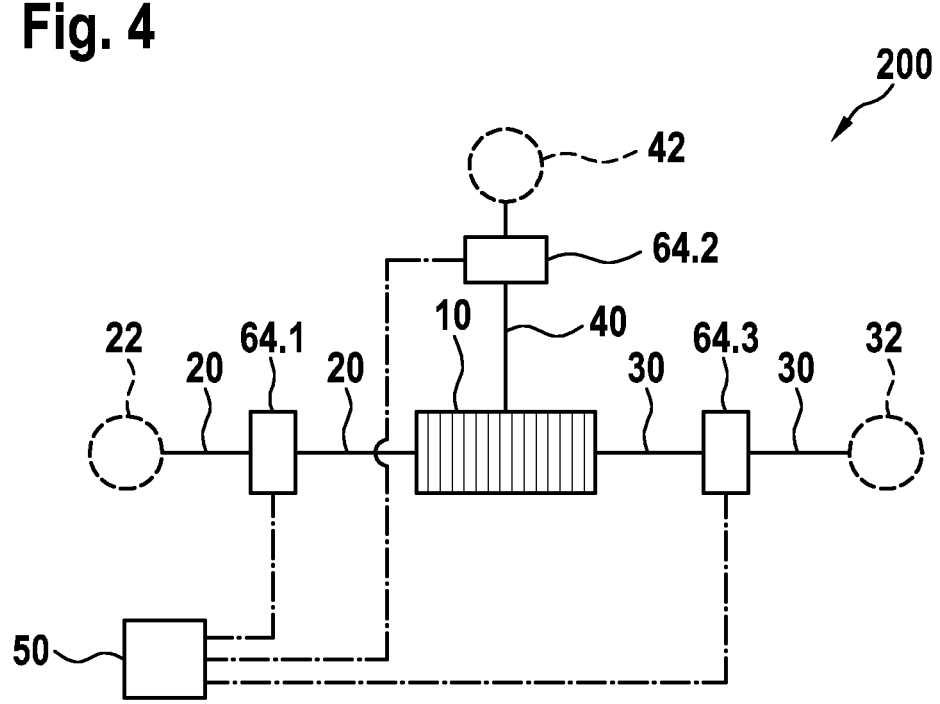

In the embodiment in FIG. 4, a control unit 50 as in FIG. 3 controls a component 64.1 of the anode gas pathway, and additionally a component 64.3 of the cathode gas pathway and a component of the cooling fluid pathway 64.2. The fuel cell system 200 consequently has multiple vibration generators 60. It is possible here for the component 64.1 in the anode gas pathway to be a recirculation pump, the component 64.3 in the cathode gas pathway to be an air compressor, and the component 64.2 to be a valve. The fuel cell stack 10 may be set in a vibrating state by any individual vibration generator 64.1, 64.2 and 64.3. The vibration generators 64.1, 64.2 and 64.3 are advantageously actuated synchronously by the control unit 50. In other words, the vibrating states are additive, and the fuel cell system 10 experiences an enhanced vibrating state. The energy expenditure of each vibration generator 60 can thus be reduced, and the components of any pathway are subjected only to minor stress.

Figure 5:
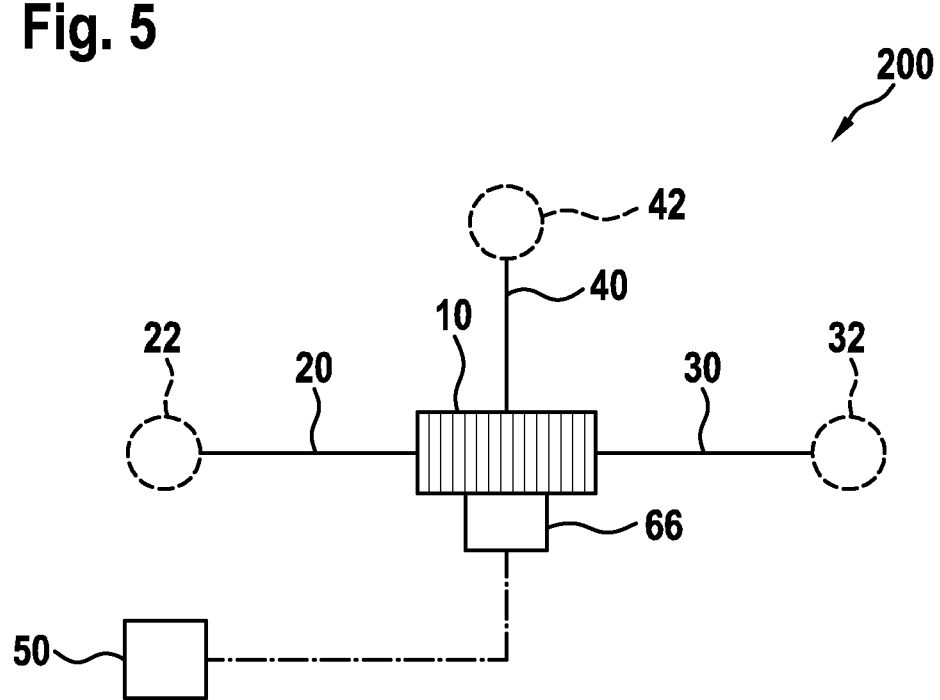

FIG. 5 shows, in a further embodiment, a fuel cell system 200 with a knocker component 66 which is actuated by a control unit 50. The knocker component 50 is disposed on a fuel cell stack 10 and preferably impacts with bipolar plates of the fuel cell stack 10. The knocker component 66 may be an actuator which is actuated via the control unit 50 and performs mechanical movements as impacts. Proceeding from the bipolar plates, it is thus particularly advantageously also possible to set other components of the fuel cell stack 10, such as membranes and/or gas diffusion layers, in the vibrating state.

Figure 6:
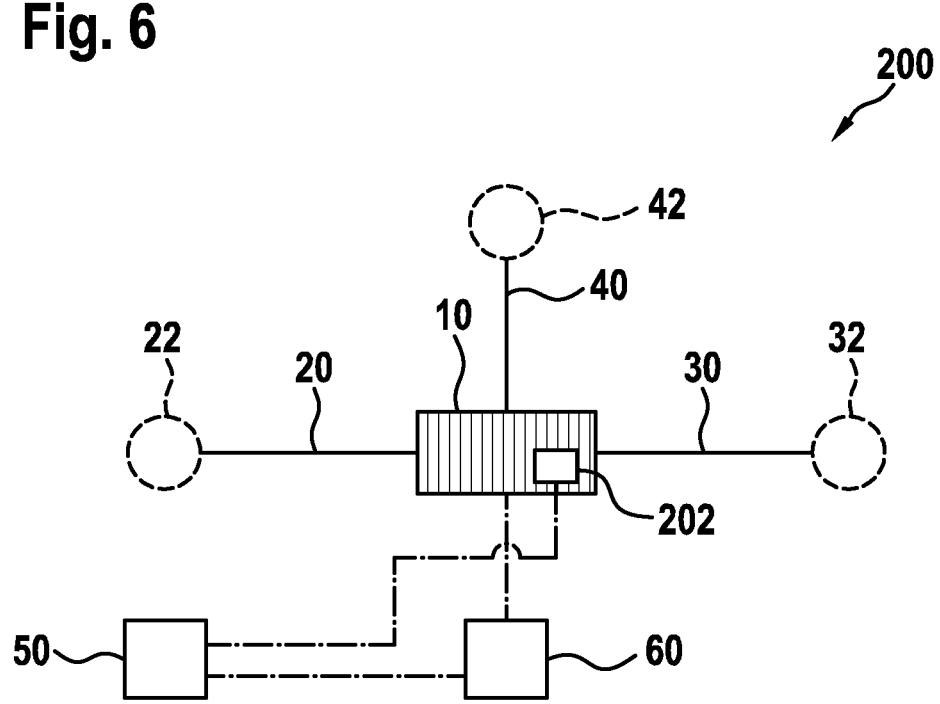

FIG. 6 shows an embodiment of a fuel cell system 200 with a water content sensor 202. The water content sensor 200 is disposed in the fuel cell stack 10 and ascertains the water content of the fuel cell stack 10, especially of gas diffusion layers and/or of membranes. Moreover, the water content sensor 202 is connected to a control unit 50 and transmits the water content of the fuel cell stack to the control unit 50. The control unit 50 is also connected to a vibration generator 60. Depending on the water content ascertained by the water content sensor 202, the control unit 50 can actuate the vibration generator in such a way that there is an appropriate water content in the fuel cell stack 10. This means that essentially no and especially no channels of bipolar plates and/or of gas diffusion layers are impermeable to fluid, i.e. blocked. It is thus ensured that the anode gas and cathode gas can flow freely and enter into chemical reactions in the fuel cell stack 10. If the water content sensor 202 ascertains an excessively high water content, the fuel cell stack 10 can, for example, be set in a vibrating state with elevated frequency and/or amplitude.

Figure 7:
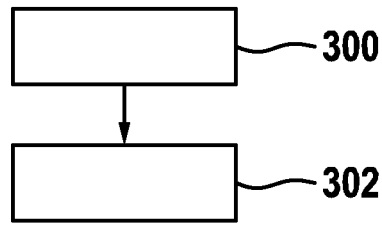

FIG. 7 shows a method of the invention wherein, in the method, a vibration generator 60 is actuated 300 by means of a control unit 50, and hence a fuel cell stack 10 is set 302 in the vibrating state by means of the vibration generator 60.

Figure 8:
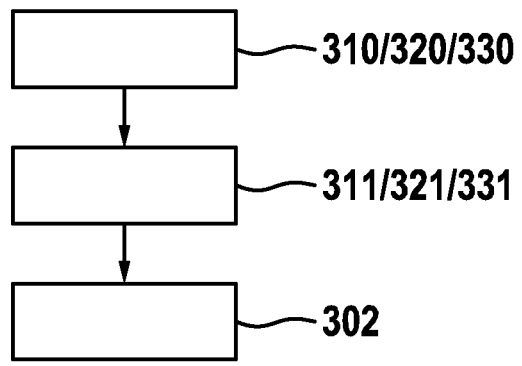

FIG. 8 shows a method of the invention wherein a control unit 50 actuates 310, 320, 330 a voltage transformer 62 or the component 64 or the knocker component 66, and the voltage transformer 62 or component 64 or knocker component 66 draws 311 current in a pulsed manner from the fuel cell stack 10, or is switched 321 between at least a first switching state and a second switching state, or impacts 331 with the fuel cell stack 10, such that the fuel cell stack 10 is set 302 in the vibrating state.

Figure 9:
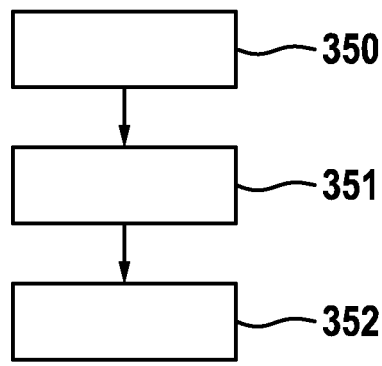

FIG. 9 shows a method of the invention wherein a water content sensor 202 ascertains 350 the water content of a fuel cell stack 10 and communicates it 351 to a control unit 50, wherein the control unit 50 controls 352 actuating 300 of a vibration generator 60 by means of the control unit 50 and setting 302 of the fuel cell stack 10 in a vibrating state by means of the vibration generator 60, depending on the water content ascertained by the water content sensor 202.

The invention claimed is:

1. A fuel cell system (200), wherein the fuel cell system (200) comprises:
    a fuel cell stack (10),
    an anode gas pathway (20) in fluid communication with the fuel cell stack (10) for supply of the fuel cell stack (10) with anode gas from an anode gas reservoir (22),
    a cathode gas pathway (30) in fluid communication with the fuel cell stack (10) for supply of the fuel cell stack (10) with cathode gas from a cathode gas reservoir (32),
    a cooling fluid pathway (40) in fluid communication with the fuel cell stack (10) for supply of the fuel cell stack (10) with cooling fluid from a cooling fluid reservoir (42),
    a vibration generator (60) for setting the fuel cell stack (10) in a vibrating state,
    a control unit (50) in data communication with the vibration generator (60) and for actuating the vibration generator (60) to set the fuel cell stack (10) in the vibrating state via the vibration generator (60), and
    a water content sensor (202) in data communication with the control unit (50) for ascertaining the water content of a gas diffusion layer within the fuel cell stack (10),
    wherein the control unit (50) actuates the vibration generator (60) to vary the vibrating state as a function of the water content of the fuel cell stack (10) ascertained by the water content sensor (202).

2. The fuel cell system (200) as claimed in claim 1, wherein the fuel cell system (200) comprises, as the vibration generator (60), a voltage transformer (62) in electrical communication with the fuel cell stack (10) for conversion of the output voltage of the fuel cell stack (10), where the voltage transformer (62) is designed for actuation upstream of the control unit (50) in such a way that the fuel cell stack (10) can be set in the vibrating state by drawing of a pulsed current by the voltage transformer (62) from the fuel cell stack (10).

3. The fuel cell system (200) as claimed in claim 1, wherein the fuel cell system (200) comprises, as vibration generator (60), a component (64) of the anode gas pathway (20) and/or of the cathode gas pathway (30) and/or of the cooling fluid pathway (40) for control of the flow of the anode gas and/or of the cathode gas and/or of the cooling fluid, where the component (64) is designed to be actuated by the control unit (50) in such a way that the component (64) is switchable between at least a first switching state and a second switching state, such that the fuel cell stack (10) can be set in the vibrating state by the switching of the component (64).

4. The fuel cell system (200) as claimed in claim 3, wherein the component (64) is one of the following components:
    a valve,
    a compressor.

5. The fuel cell system (200) as claimed in claim 1, wherein the fuel cell system (200), as vibration generator (60), comprises a knocker component (66) disposed on the fuel cell stack (10) for impacting with the fuel cell stack (10), wherein the knocker component (66) is mechanically connected to the fuel cell stack (10) and is designed to be actuated by the control unit (50) in such a way that the fuel cell stack (10) is set in the vibrating state by the impacting with the fuel cell stack (10).

6. A method of operating a fuel cell system (200) that includes a fuel cell stack (10), an anode gas pathway (20) in fluid communication with the fuel cell stack (10) for supply of the fuel cell stack (10) with anode gas from an anode gas reservoir (22), a cathode gas pathway (30) in fluid communication with the fuel cell stack (10) for supply of the fuel cell stack (10) with cathode gas from a cathode gas reservoir (32), a cooling fluid pathway (40) in fluid communication with the fuel cell stack (10) for supply of the fuel cell stack (10) with cooling fluid from a cooling fluid reservoir (42), a vibration generator (60) for setting the fuel cell stack (10) in a vibrating state, a control unit (50) in data communication with the vibration generator (60) and for actuating the vibration generator (60) to set the fuel cell stack (10) in the vibrating state via the vibration generator (60), and a water content sensor (202) in data communication with the control unit (50) for ascertaining the water content of a gas diffusion layer within the fuel cell stack (10), the method comprising:
    ascertaining (350) the water content of the fuel cell stack (10) via the water content sensor (202),
    communicating the water content (351) to the control unit (50) via the water content sensor (202), actuating (300) the vibration generator (60) via the control unit (50), setting (302) the fuel cell stack (10) in the vibrating state via the vibration generator (60), and varying, via the control unit (50), the vibrating state as a function of the water content of the fuel cell stack (10) ascertained by the water content sensor (202).

7. The method as claimed in claim 6, wherein the control unit (50) actuates (310) a voltage transformer (62), and the voltage transformer (62) draws current (311) in pulsed form from the fuel cell stack (10), such that the drawing of pulsed current sets (302) the fuel cell stack (10) in the vibrating state.

8. The method as claimed in claim 6, wherein the control unit (50) actuates (320) a component (64) of the anode gas pathway (20) and/or of the cathode gas pathway (30) and/or of the cooling fluid pathway (40) for control of the flow of the anode gas and/or of the cathode gas and/or of the cooling fluid, and the component (64) is switched (321) between at least a first switching state and a second switching state, such that the switching sets (302) the fuel cell stack (10) in the vibrating state.

9. The method as claimed in claim 6 in conjunction with a fuel cell system (200), wherein the control unit (50) actuates (330) a knocker component (66) disposed on the fuel cell stack (10) for impacting with the fuel cell stack (10) and the knocker component (66) impacts with (331) the fuel cell stack (10), such that the impacting sets (302) the fuel cell stack (10) in the vibrating state.

10. The method as claimed in claim 6, wherein the vibration generator (60) sets (302) the fuel cell stack (10) in the vibrating state with a frequency of 500 Hz to 50 kHz.

11. The method as claimed in claim 6, wherein the vibration generator (60) sets (302) the fuel cell stack (10) in the vibrating state with a frequency of 50 Hz to 200 kHz.

12. The method as claimed in claim 6, wherein the vibration generator (60) sets (302) the fuel cell stack (10) in the vibrating state at particular time intervals.

\* \* \* \* \*